(12) United States Patent
Nojima

(10) Patent No.: US 7,956,906 B2
(45) Date of Patent: Jun. 7, 2011

(54) IMAGE CORRECTION DEVICE, IMAGE CORRECTION METHOD, AND COMPUTER READABLE MEDIUM

(75) Inventor: Osamu Nojima, Hachioji (JP)

(73) Assignee: Casio Computer Co., Ltd., Tokyo (JP)

( * ) Notice: Subject to any disclaimer, the term of this patent is extended or adjusted under 35 U.S.C. 154(b) by 458 days.

(21) Appl. No.: 11/904,288

(22) Filed: Sep. 26, 2007

(65) Prior Publication Data

US 2008/0079822 A1  Apr. 3, 2008

(30) Foreign Application Priority Data

Sep. 29, 2006  (JP) ................................ 2006-268297
Jul. 13, 2007  (JP) ................................ 2007-183786

(51) Int. Cl.
*H04N 5/76* (2006.01)
(52) U.S. Cl. .............. 348/231.99; 348/231.3; 348/220.1
(58) Field of Classification Search ............. 348/231.99, 348/231.3, 220.1
See application file for complete search history.

(56) References Cited

U.S. PATENT DOCUMENTS

| 7,800,677 | B2 * | 9/2010 | Abe .................. 348/333.01 |
| 2002/0097441 | A1 * | 7/2002 | Hara et al. .................. 358/302 |
| 2004/0036898 | A1 | 2/2004 | Takahashi |
| 2004/0117729 | A1 * | 6/2004 | Ariga .................. 715/500.1 |
| 2004/0165085 | A1 * | 8/2004 | Shibutani .................. 348/231.3 |
| 2005/0007468 | A1 * | 1/2005 | Stavely et al. ................ 348/239 |
| 2006/0055784 | A1 * | 3/2006 | Sugihara et al. ......... 348/207.99 |
| 2006/0055785 | A1 * | 3/2006 | Nagajima ................ 348/207.99 |
| 2007/0171282 | A1 * | 7/2007 | Yanagi .................... 348/207.99 |

FOREIGN PATENT DOCUMENTS

| CN | 1487737 A | 4/2004 |
| JP | 2002-10134 A | 1/2002 |
| JP | 2002010134 A * | 1/2002 |
| JP | 15-319298 A | 11/2003 |

OTHER PUBLICATIONS

A Chinese Office Action (and English translation thereof) dated Oct. 24, 2008, issued in a counterpart Chinese Application.
Korean Office Action dated Mar. 12, 2009 and English translation thereof issued in counterpart Korean Application No. 10-2007-0093530.

* cited by examiner

*Primary Examiner* — Timothy J Henn
*Assistant Examiner* — Cynthia Calderon
(74) *Attorney, Agent, or Firm* — Holtz, Holtz, Goodman & Chick, PC

(57) ABSTRACT

An image correction apparatus comprises a sample image memory configured to store sample images corresponding to types of objects, a display unit configured to display the sample images stored in the sample image memory unit to make a user select one of the sample images, and a corrector configured to correct an image read from a storage based on a type of a sample image selected by the user.

8 Claims, 7 Drawing Sheets

FIG.3

| Shooting Condition Number / Shooting Parameter | 0001 | 0002 | 0003 | 0004 | 0005 | 0006 | 0007 | 0008 | 0009 |
|---|---|---|---|---|---|---|---|---|---|
| Shooting Condition Name | PERSON SHOOTING | SCENE SHOOTING | PERSON +SCENE SHOOTING | CANDLE LIGHT | FLOWER | VIVIDLY DISPLAY GREEN | EVENING SUN | NIGHT VIEW | TWILIGHT |
| COLOR CONTRAST | SKIN-COLORED | | SKIN-COLORED | | | GREEN | | | |
| SHARPNESS | | +2 | | -2 | | +2 | | | +2 |
| SATURATION | | +2 | | | +2 | +2 | | | |
| WHITE BALANCE | | | | SUNLIGHT | | | SUNLIGHT | SUNLIGHT | |
| FILTER | | | | | | | RED | | PURPLE |

| SHOOTING CONDITION NUMBER / SHOOTING CONDITION NAME / SHOOTING PARAMETERS | 0001 | 0002 | 0003 | 0004 | 0005 |
|---|---|---|---|---|---|
| | NIGHT VIEW | NIGHT PERSON | PERSON AND NIGHT VIEW | FLOWER | BACK LIGHT PERSON |
| FOCUS | SPOT AF | SPOT AF | SPOT AF | MACRO | MULTI-AREA AF |
| APERTURE | AUTO | AUTO | FIXED | LIMIT TO F3 OR LESS | AUTO |
| SHUTTER SPEED (CHARGE STORAGE TIME) | AUTO | AUTO | AUTO | AUTO | AUTO |
| EV SHIFT | LIMIT TO +2 EV | LIMIT TO +1 EV | 0 | 0 | +3 EV |
| WHITE BALANCE | SUNLIGHT | AUTO | AUTO | AUTO | AUTO |
| FLASH EMISSION | INHIBIT EMISSION | FORCEDLY EMISSION | FORCEDLY EMISSION | AUTO | FORCEDLY EMISSION |
| SATURATION | 0 | +1 | 0 | +1 | +1 |

Tn

IMAGE CORRECTION DEVICE, IMAGE CORRECTION METHOD, AND COMPUTER READABLE MEDIUM

CROSS-REFERENCE TO RELATED APPLICATIONS

This application is based upon and claims the benefit of priority from prior Japanese Patent Applications No. 2006-268297, filed Sep. 29, 2006; and No. 2007-183786, filed Jul. 13, 2007, the entire contents of both of which are incorporated herein by reference.

BACKGROUND OF THE INVENTION

1. Field of the Invention

The present invention relates to an image correction device, an image correction method, and a computer readable medium that correct a recorded image.

2. Description of the Related Art

Conventionally, a digital camera is equipped with a plurality of shooting modes in accordance with the type of objects such as portrait, scenery and night view. A shooting mode corresponding to the type of an object is previously selected. By doing so, in image shooting, image quality control condition with respect to an image, that is, image processing contents such as color contrast, sharpness, saturation, white balance and color filter are automatically set.

Meanwhile, Jpn. Pat. Appln. KOKAI Publication No. 2002-10134 discloses the following technique. According to the technique, many sample images given as shot samples showing various types of objects (hereinafter, referred to as shooting scenes) are prepared. User previously selects a shooting scene which resembles an object to be shot or a shooting scene having favorite atmosphere. In shooting, an image quality control condition is automatically set in accordance with the selected shooting scene (hereinafter, best shot function).

The foregoing best shot function provides a large number of shooting modes corresponding to various shooting scenes. Simultaneously, the best shot function can simply and securely set the foregoing image quality control condition suitable for user's purpose in shooting.

As described above, even if the digital camera previously has shooting modes corresponding to the type of objects, there exist many cases where shooting is performed without setting any shooting modes. Moreover, there exists the case where user wants to add favorite atmosphere to the already recorded image. In such a case, user controls the image quality of the recorded image on a computer using an optional image processing software (what we call, retouch software). In this way, the recorded image is processed to an image having the same atmosphere as the case of shooting under the shooting mode corresponding to a specific type of an object. However, the foregoing image quality control work of the recorded image is complicated. In addition, user's experience and knowledge are required to some degree to perform the image quality control work. For this reason, there is a problem that anybody does not readily perform the image quality control work.

BRIEF SUMMARY OF THE INVENTION

According to an embodiment of the present invention, an image correction apparatus comprises a sample image memory configured to store sample images corresponding to types of objects, a display unit configured to display the sample images stored in the sample image memory unit to make a user select one of the sample images, and a corrector configured to correct an image read from a storage based on a type of a sample image selected by the user.

According to another embodiment of the present invention, an image correction apparatus comprises a selection controller configured to make a user select one of correction modes corresponding to types of objects, a first corrector configured to correct an image which is shot by a predetermined shooting condition corresponding to a type of an object and read from a storage such that a corrected image has an original image quality which is obtained when an image is shot by a standard shooting condition which is obtained by eliminating a specific shooting condition to the type of the object from the predetermined shooting condition, and a second corrector configured to correct an image corrected by the first corrector based on a selected correction mode selected by the user.

According to another embodiment of the present invention, an image correction apparatus comprises a selection controller configured to make a user select one of correction modes corresponding to types of objects, and a corrector configured to correct an image which is shot by a predetermined shooting condition corresponding to a type of an object and read from a storage based on a difference between the predetermined shooting condition and a correction condition corresponding to a selected correction mode selected by the user.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the present invention and, together with the general description given above and the detailed description of the embodiments given below, serve to explain the principles of the present invention in which:

FIG. 3 is a view showing a shooting condition table T;

FIG. 7 is another shooting condition table corresponding to FIG. 3 in the case where mechanical conditions are included into shooting conditions.

DETAILED DESCRIPTION OF THE INVENTION

An embodiment of an image correction apparatus according to the present invention will now be described with reference to the accompanying drawings. The embodiment relates to a digital camera which is equipped with the already described best shot function and following another function (hereinafter, referred to as best reproduction function). The best reproduction function modifies an image quality of a recorded image shot using the best shot function into an image quality corresponding to a shooting scene different from shooting.

Figure 1:
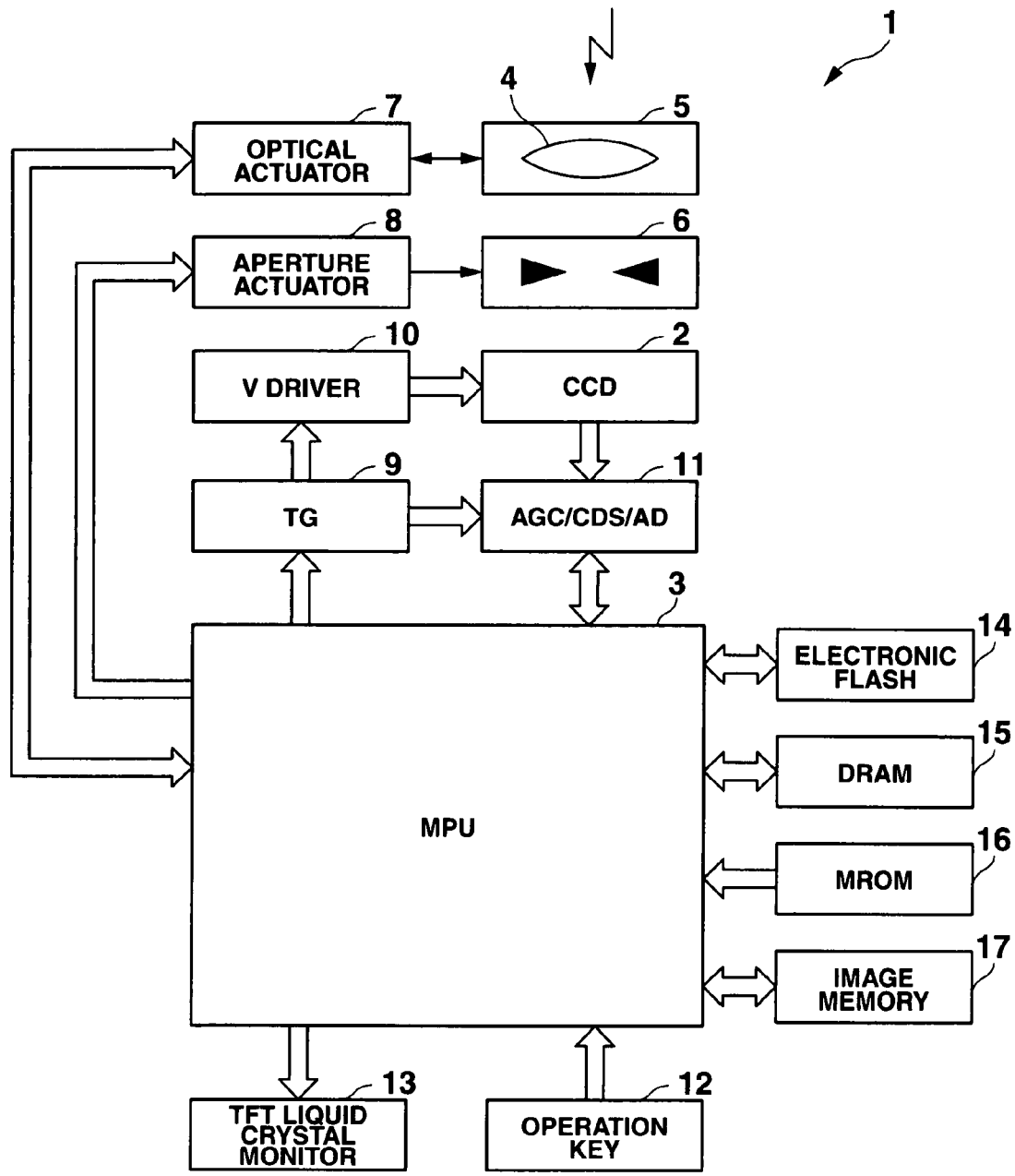
FIG. 1 is a block diagram showing the configuration of a digital camera according to an embodiment of the present invention.

FIG. 1 is a block diagram schematically showing the electrical configuration of a digital camera 1. The digital camera 1 includes a CCD given as imaging means, and mainly comprises an MPU 3. The MPU 3 has an image processing function of compressing/decompressing an image captured by the CCD 2, and generating/reproducing an image file having an Exif format.

An optical image of an object is incident on a light receiving surface of the CCD 2 via an optical system forming a zoom lens and a focus lens and an aperture 6. The optical system 4 is supported by an actuator mechanism 5 comprising an AF motor and a zoom motor. A drive signal output from an optical actuator 7 is supplied to the actuator mechanism 5 according to a control signal from the MPU 3, and thus, the optical system 4 is actuated along an optical axis. The aperture 6 is actuated according a drive signal generated from an aperture actuator 8 based on the control signal from the MPU 3 to control a quantity of light of the object image incident on the CCD 2.

On the other hand, the MPU 3 is connected to a timing generator (TG) 9 generating a timing signal. The CCD 2 is driven according to a drive signal generated by a V driver 10 (vertical driver) based on the timing signal generated by the TG 9. Then, the CCD 2 outputs an analog image signal corresponding to a luminance of the object image to an analog signal processor 11.

The analog signal processor 11 comprises an analog amplifier, that is, gain control amplifier (AGC), a correlated double sampling (CDS) circuit and an analog-to-digital converter (AD) for digitizing an analog signal. A black level of an output signal of the CCD 2 is adjusted to a standard black level in the analog signal processor 11 and the output signal of the CCD 2 is sampled and then sent as a digital signal to the MPU 3.

Moreover, the MPU 3 is connected to an operation key 12, a TFT liquid crystal monitor 13, an electronic flash 14, a DRAM 15, a mask ROM (MROM) 16 and an image memory 17.

The operation key 12 is composed of a power key, a shutter key, various mode setting keys, a menu key, a cross key and a set key. A signal with these key operations is directly sent to the MPU 3. According to the embodiment, the foregoing mode setting key includes the following keys. One is a recording mode key for setting a shooting record mode, which is a basic operation mode of the digital camera. Another is a reproducing mode key for setting a reproducing mode for reproducing a recorded image. Another is a best shot key (BS key) for instructing the use of the best shot function in a recording mode.

The electronic flash 14 is composed of a light emitting tube emitting auxiliary light in shooting based on the instruction from the MPU 3, and its drive circuit.

The DRAM 15 is used as a work memory, and the image memory 17 is an image recording memory comprising various types of memory cards. The digital signal (image signal) from the CCD 2 to the MPU 3 is temporality stored in the DRAM 15, and subjected to various image processing by the MPU 3. Further, the digital signal is compressed and encoded according to JEPG (Joint Photograph coding Experts Group) format, and thereafter, recorded as image data file in the image memory 17.

The MPU 3 reads the image data file recorded in the image memory 17 as the necessity arises. The image data is generated as a digital video signal or analog vide signal via processing such as decompression and addition of a luminance signal and a color signal. In this way, the image data is displayed on the TFT liquid crystal monitor 13. An image periodically captured in the recording mode is displayed as a through image on the TFT liquid crystal monitor 13.

The MROM 16 is a program ROM storing various operation programs required for control of each component in the MPU 3 and data processing. The MROM 16 also stores program AE data configuring a program chart showing a combination of an aperture value (F) corresponding to a proper exposure value (EV) in shooting and a shutter speed.

The MPU 3 makes an AE control by the shutter speed, that is, a charge storage time of the CCD 2, an open of the aperture 5, gain control of the gain control amplifier (AGC) of the analog processor according to the program chart. Moreover, the MPU 3 makes AF (auto focus) control for actuating a focus lens and auto white balance (AWB) control. When the shutter key is pressed, that is, shooting operation is performed, auxiliary light is emitted by the electronic flash 14 as the necessity arises to control the light emission.

When the BS key is pressed in the record mode for shooting, the MPU 3 makes a sample image display and controls relevant to shooting condition settings in accordance with sample images (shooting scenes) selected by user. Further, when the BS key is pressed in the reproducing mode, the MPU 3 takes a procedure including sample image display (described later) in accordance with user's key operation. Namely, the MPU 3 functions as a selection controller and a corrector of the present invention.

Figure 2:
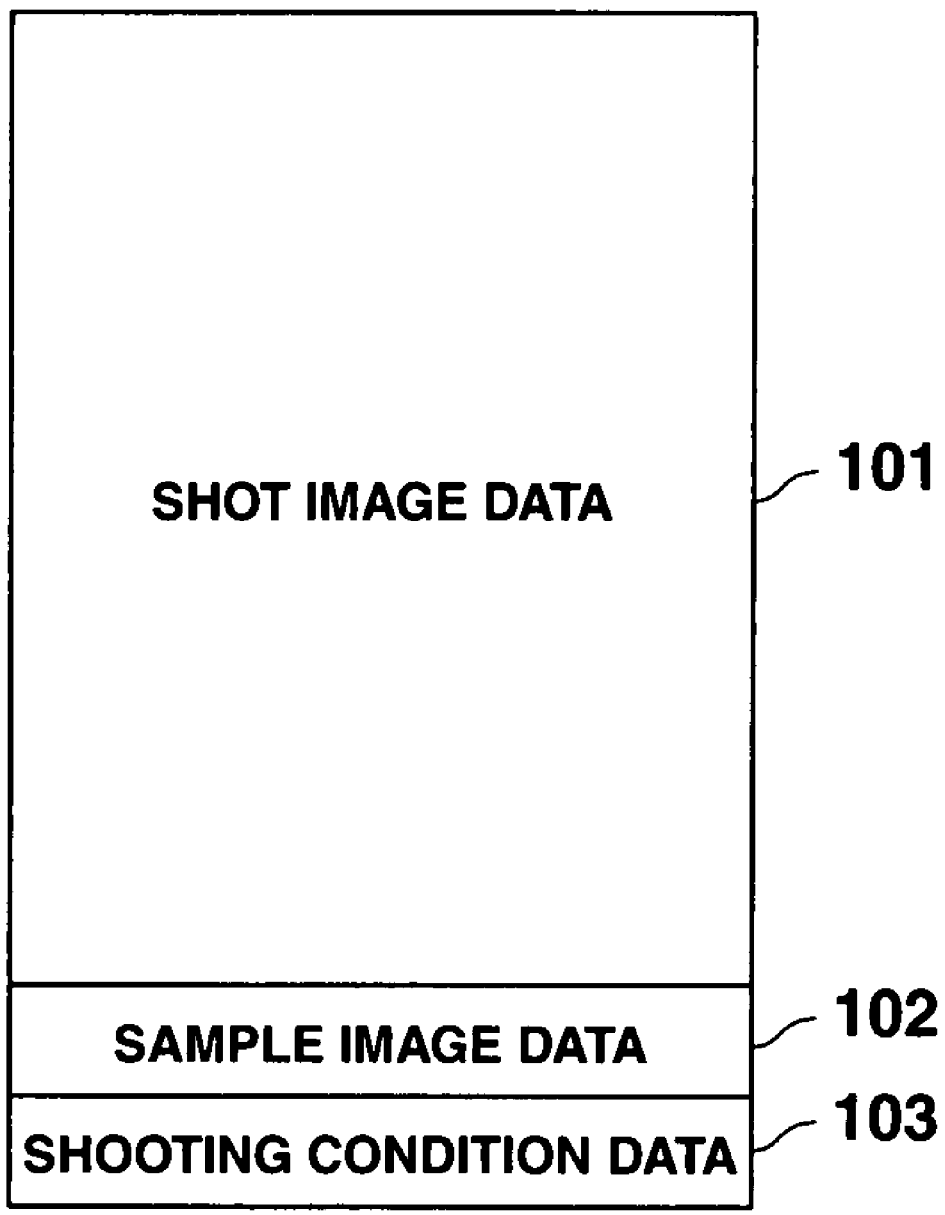
FIG. 2 is a conceptual view showing storage data of an image memory.

As shown in FIG. 2, the image memory 17 stores sample image data 102 and shooting condition data 103 in an area independent from a storage area of captured image data (image file) 101. The sample image data 102 and the shooting condition data 103 are used for the best shot function or the best reproduction. The sample image data 102 is a plurality of sample image data corresponding to various types of objects (shooting scenes).

The shooting condition data 103 is data configuring a shooting condition table T shown in FIG. 3. The data is composed of a shooting condition name managed by a shooting condition number and shooting parameters. The shooting condition name and the shooting parameters correspond to each of the foregoing plurality of sample images. The shooting parameters are data showing a shooting condition for obtaining the same shooting result as the corresponding sample image. Specifically, the shooting parameters are parameters showing setting contents of several control items such as color contrast, sharpness, saturation, white balance and filter, which are controllable in shooting. Incidentally, the sample image data 102 and the shooting condition data 103 may be stored in the MROM 16 without being limited to the image memory 17.

Figure 4:
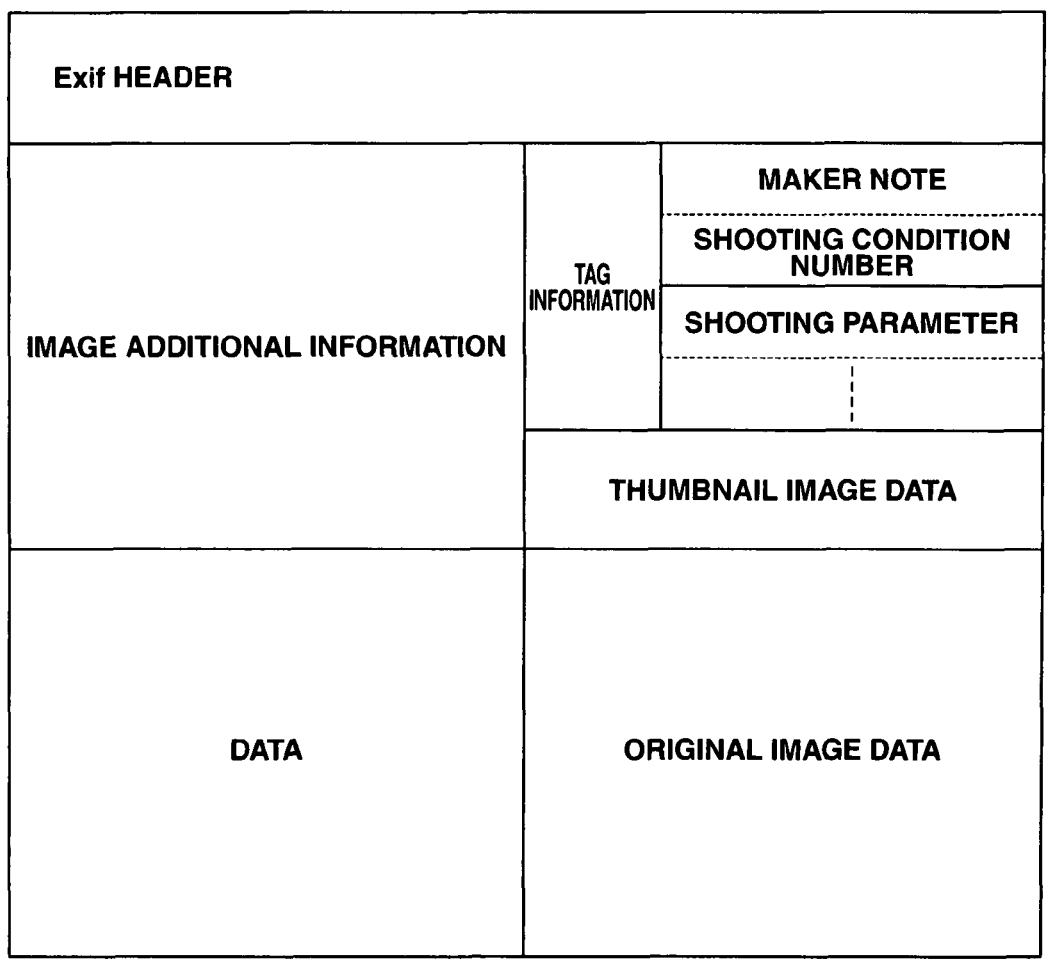
FIG. 4 is a conceptual view showing the configuration of image file data.

FIG. 4 is a conceptual view showing an image file recorded in the image memory 17, that is, the configuration of image file data in the Exif format. The Exif standard image file is composed of a header, image additional information, and original image data (compressed data). The Exif header is used for identifying an Exif standard file. The image additional information is composed of tag information including various information related to image data and thumbnail image data. The original image data is the original of the thumbnail image data. The tag information includes a maker note describing maker individual information and other data. In an image file recorded using the best shot function, the foregoing shooting condition number is described in the maker note as seen from FIG. 4. General shooting parameters are described in other portion together with file information. Incidentally, maker individual shooting parameters are described in the maker note.

The foregoing digital camera 1 operates in the following manner when recording and reproducing modes are set. The operation in the recording and reproducing modes will be schematically explained below.

Figure 5:
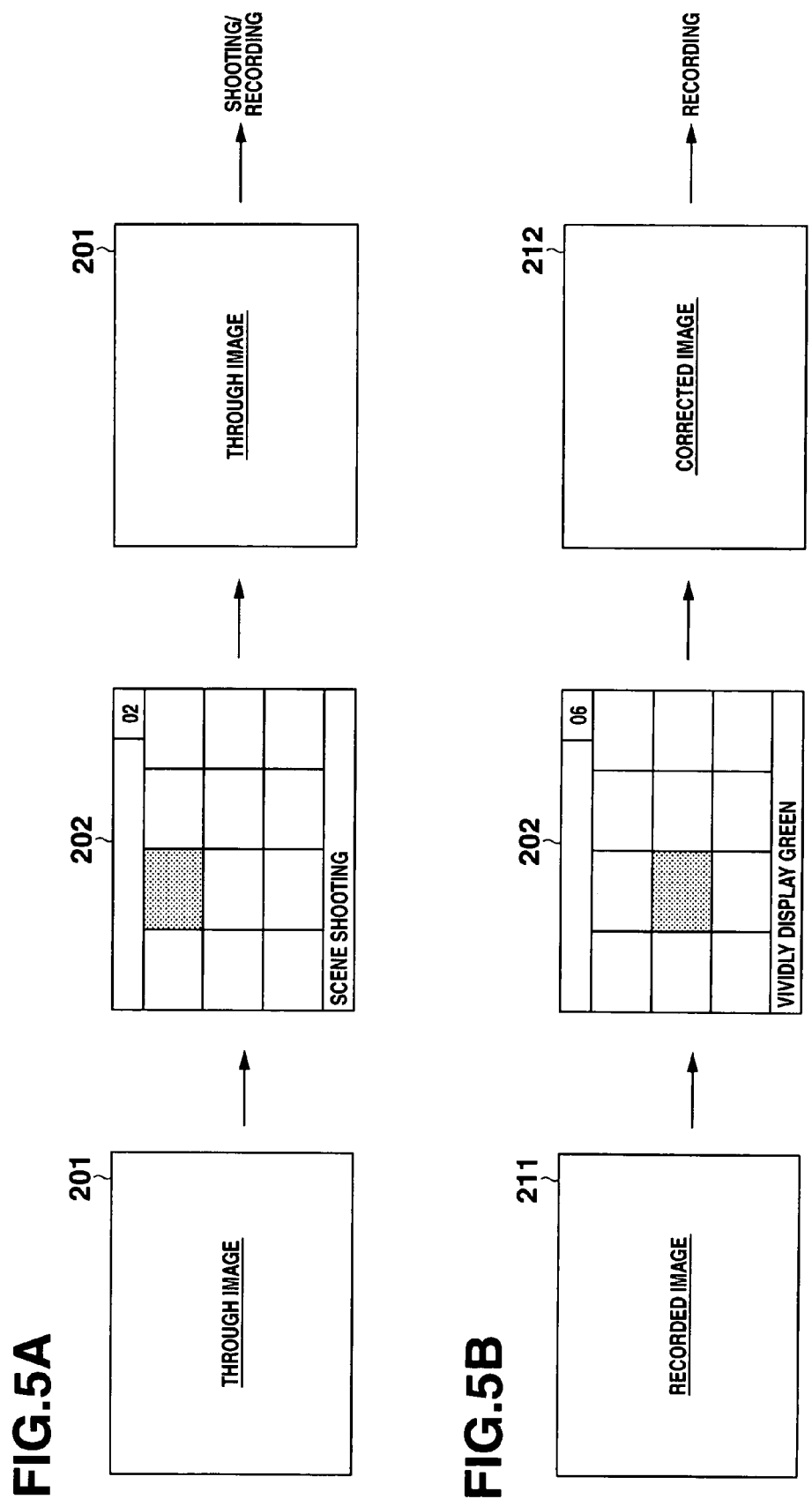
FIG. 5A and FIG. 5B are view to schematically explain each operation of a recording mode and a reproducing mode.

FIG. 5A is a view to explain the operation in the case where shooting using the best shot function is performed in the recording mode. The digital camera 1 displays a scene select screen 202 comprising the foregoing many sample images when the BS key is pressed in a shooting standby state displaying a through image 201 on the TFT liquid crystal monitor in the recording mode. In this way, user selects and determines a desired shooting scene.

Any shooting scene is selected and determined, and thereafter, the digital camera 1 again returns to the shooting standby state. In this state, when the shutter key is pressed, the digital camera 1 makes a shooting operation according to the shooting condition corresponding to the selected shooting scene (sample image). Namely, the digital camera 1 makes shooting based on a predetermined shooting mode to capture an image, and then, records it as an image file.

On the other hand, FIG. 5B is a view to explain the operation in the case where the best reproduction function is performed in the reproducing mode. The digital camera 1 displays a scene select screen 202 comprising the foregoing many sample images when the BS key is pressed in a reproducing state displaying a recorded image (shot image) 211 on the TFT liquid crystal monitor 13 in the reproducing mode. Then, user selects and determines a desired shooting scene. The scene select screen 202 displayed here is the same as displayed with the BS key operation in the recording mode.

Any shooting scene is selected and determined, and thereafter, the digital camera 1 corrects the image quality of the reproduced image according to the shooting condition corresponding to the determined shooting scene (sample image). In other words, image quality correction is performed via a predetermined reproducing mode, and the digital camera 1 once displays a corrected image 212 on the TFT liquid crystal monitor 13. Further, in this state, when the shutter key is pressed, the digital camera 1 records the displayed image (corrected image) 212 as a new image file independently from the recorded image.

Figure 6:
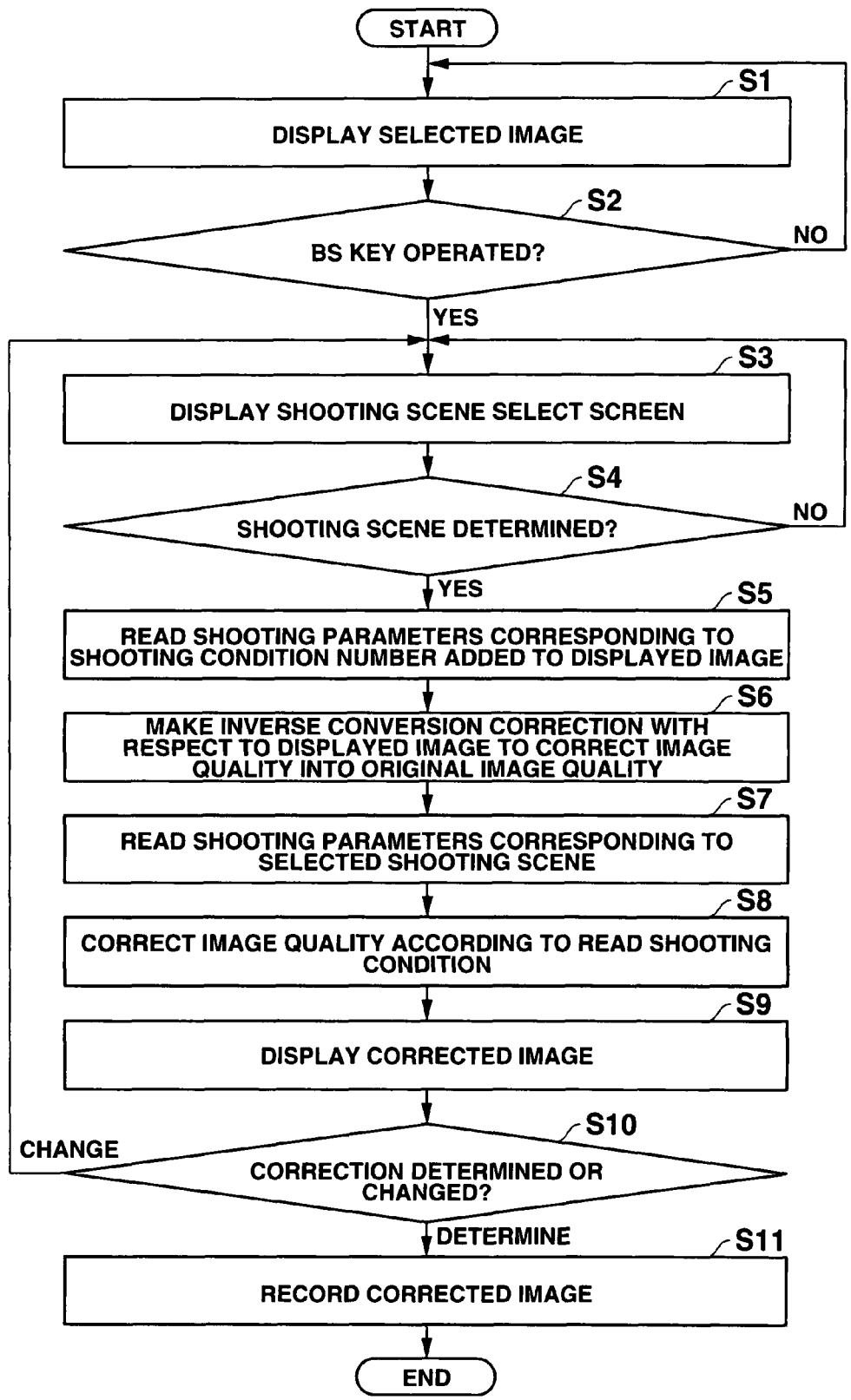
FIG. 6 is a flowchart showing procedure contents in a reproducing mode.

FIG. 6 is a flowchart to explain the procedure contents executed by the MPU 3 when user selects a recorded image in the reproducing mode.

When a recorded image is selected, the MPU 3 reads compressed data (image file) of the selected recorded image (shot image) from the image memory 17. Then, the MPU 3 decompresses the compressed data to develop it to the DRAM 15, and thereafter, displays it on the TFT liquid crystal monitor 13 (step S1). The MPU 3 determines whether or not user operates the BS key. If the BS key is not pressed (NO in step S2), the MPU 3 returns to step S1 to continue a display of the recorded image 211 (see FIG. 5B).

On the other hand, if the BS key is pressed (YES in step S2), the MPU 3 reads the sample image data 102 stored in the image memory 17 and part (shooting condition number and shooting condition name) of the shooting condition data 103. Then, the MPU 3 displays the scene select screen 202 (see FIG. 5B) on the TFT liquid crystal monitor 13 (step S3). In this way, user selects a desired shooting scene (sample image) by a predetermined key operation.

When the shooting scene is determined (YES in step S4), the MPU 3 reads shooting parameters shown in FIG. 3 corresponding to the shooting condition number added to the recorded image 211 displayed on the monitor 13, that is, shooting parameters used in shooting (step S5). Based on the read shooting parameters, the MPU 3 makes inverse conversion correction with respect to the recorded image 211 (image data of the DRAM 15) to correct the image quality into an original image quality (which is not subjected to the image quality control based on the best shot function) (step S6).

In other words, image processing inverse to the image processing given in shooting is carried out. By doing so, the image quality of the recorded image 211 is corrected into the original image quality which is not subjected to the image quality control based on the best shot function, that is, shooting using the best shot function is not carried out. Specifically, for example, shooting parameters corresponding to the shooting condition number "2" and the shooting condition name "scene shooting" are used in shooting. In this case, image processing, that is, sharpness is set to "+2" and saturation is set to "+2". Therefore, the sharpness is set to "−2" and the saturation is set to "−2" herein.

The MPU 3 reads shooting parameters corresponding to the shooting scene selected by user in the foregoing scene select screen 202 from the image memory 17 (step S7). According to the read shooting parameters, the image corrected such that the image quality is corrected to the original image quality is again corrected (step S8). Namely, shooting parameters of the newly selected shooting scene is used as an image quality correction condition, and then, image processing corresponding to the contents of the image quality correction condition is performed with respect to the image having the original image quality state. Specifically, for example, the newly selected shooting scene corresponds to the shooting condition number "6" and the shooting condition name "vividly display green". In this case, image processing, that is, color contrast is performed with respect to "green", sharpness is set to "+2" and saturation is set to "+2".

Thereafter, the image at that time is displayed as the final corrected image 212 (see FIG. 5B) on the TFT liquid crystal monitor 13 (step S9). The corrected image 212 is displayed, and thereafter, correction is determined when user presses the shutter key (YES in step S10). If the foregoing instruction is given, the corrected image 212 is recorded as a new image file in the image memory independently from the recorded image 211 before correction (step S11). If a change instruction is given via a predetermined key operation (NO in step S10), the MPU 3 returns to the foregoing step S3. Then, the MPU 3 displays the scene select screen 202 on the TFT liquid crystal monitor 13 so that user again selects a desired shooting scene (sample image). Hereinafter, the foregoing operation is repeated.

The digital camera of this embodiment has the following advantage. Namely, the recorded image 211 (shot image) is corrected such that the image has the same atmosphere as shot in the shooting mode corresponding to the specific object, that is, the shooting scene. In this case, user presses the BS key to display the scene select screen 202 shown in FIG. 5, and thereafter, only selects a desired shooting scene. Thus, anybody can readily do a correction work on the recorded image. The procedure is the same as the case of making shooting using the best shot function; therefore, the digital camera is extremely easy to use.

Even if the recorded image of the correction target is shot using the best shot function, i.e., under a shooting condition corresponding to a specific shooting scene (type of object), the image quality of the recorded image is once returned to the original image quality, and thereafter, correction is performed in accordance with the shooting condition corresponding to the newly selected shooting scene (type of object). Therefore, the image quality of the recorded image is corrected to an image quality corresponding to a shooting scene different from the previous shooting without difficulty. In other words, the same atmosphere as shot in the shooting mode different from the previous shooting is added to the recorded image shot in a certain mode to which a specific shooting condition corresponding to the type of the object is applied.

As a result, suitable image processing is performed even if user changes his mind before and after shooting. Therefore, user can always obtain a shot image having his desired atmosphere.

According to this embodiment, only recorded image shot using the best shot function is given as the correction target for convenience. In fact, a recorded image shot without using the best shot function may be given as the correction target. The MPU 3 takes the following procedures in order to correct the recorded image shot without using the best shot function.

For example, the MPU 3 confirms the maker note data of the image file just after step S4. By doing so, the MPU 3 determines whether or not the recorded image 211 given as the correction target is shot using the best shot function. If the determination result is YES, the MPU 3 makes the foregoing inverse conversion correction of step S5. Conversely, if the foregoing determination result is NO, the MPU 3 skips steps S5 and S6, and then, proceeds to the procedure of step S7. Thereafter, the MPU 3 makes corrections using the recorded image 211 as the target in step S8.

In this way, the recorded image shot without using the best shot function is given as the correction target. The recorded image is corrected into an image having the same atmosphere as shot in the shooting mode corresponding to a specific type of object (shooting scene).

In this embodiment, the inverse conversion correction of step S6 is performed by determining shooting parameter from the shooting condition number (see FIG. 4). Namely, the shooting scene selected in shooting, that is, shooting parameters (shooting condition) used in shooting is read from the shooting condition number described in the maker note of the image file. The inverse conversion correction may be made as follows.

For example, the maker note describes shooting parameters used in shooting. Thus, based on the shooting parameters, the inverse conversion correction may be made. For example, there exists another digital camera including the same best shot function and best reproduction function as the digital camera 1 of this embodiment. In another digital camera, when user uses the best reproduction function, the contents of the sample image data 102 and the shooting condition data 103 stored in the image memory 17 is different, that is, part or all of shooting scenes selectable in shooting is different. Even if the foregoing case is given, inverse conversion correction is performed based on shooting parameters described in the maker note. By doing so, correction after shooting is performed without any problem.

According to this embodiment, inverse conversion correction is performed in step S6, and thereafter, correction is again made in step S8. In this way, different two-stage correction (image quality adjustment) is performed, and thus, the final corrected image 212 is obtained. In place of the foregoing two-stage correction, the following procedure may be taken. Specifically, image processing is carried out in accordance with the shooting parameters (difference condition) equivalent to the difference between shooting parameters used in shooting and shooting parameters corresponding to the shooting scene selected in reproducing. Namely, two-stage image processing may be carried out according to one-time correction.

For example, there exists the recorded image selecting the shooting scene having the shooting condition number "2" and the shooting condition name "scene shooting" in shooting. The shooting scene having the shooting condition number "6" and the shooting condition name "vividly display green" shooting" in reproducing (correction) is selected with respect to the foregoing recorded image. In this case, color contrast only with respect to "green" may be given. Even if the foregoing case is given, the same correction effect as this embodiment is obtained.

The shooting conditions determined corresponding to shooting scenes selectable in the recording mode includes control contents shown in FIG. 3 such as "color contrast," "sharpness" and "saturation." These are realized by predetermined image processing in shooting; in other words, they are image quality adjustment conditions of the present invention. Depending on the shooting scene, the corresponding shooting condition includes control contents realized by a shooting operation other than image processing, that is, mechanical conditions of the present invention.

The foregoing mechanical conditions include a shooting condition related to the control content of the shooting optical system such as "focus" and "aperture," a "shutter speed" realized by controlling the charge storage time of the CCD 2, a shooting condition related to the control content of an imaging circuit such as "EV shift" realized by controlling the charge storage time of the CCD 2 and gain of the gain control amplifier (AGC) of the analog signal processor 11, a shooting condition realized by controlling components other than the shooting optical system and imaging circuit system, such as "flash emission." Detailed shooting conditions (control content of a plurality of shooting parameters) including the mechanical conditions will be described later. When the mechanical conditions are included in the shooting condition, the following procedures are preferably taken.

The following procedure is performed in the case of obtaining the final corrected image 212 via different two-stage image processing such as inverse conversion correction (step S6) and re-correction (step S8). Namely, when the mechanical conditions are included in the shooting condition, the content of the inverse conversion correction preferably includes the processing in accordance with the mechanical conditions. For example, in the inverse conversion correction, image processing is carried out conversely to image processing capable of obtaining the effect resembling the effect by the foregoing mechanical conditions. In this case, the image quality of the recorded image is corrected to a more suitable image quality.

In this case, the original image quality given as the correction target of the inverse conversion correction is an image quality equivalent to the case where a simple AE control is carried out in shooting. In other words, the original image quality is an image quality equivalent to the case where shooting conditions set in accordance with the state of an object are used regardless of a specific type of the object. Moreover, the original image quality is an image quality equivalent to the case where a predetermined shooting condition is set in which an aperture and a shutter speed are set to predetermined values. In other words, the original image quality is an image quality equivalent to the case where a predetermined shooting condition is used regardless of a specific type of the object.

Moreover, the foregoing mechanical conditions are included in the shooting condition (image quality correction condition) in reproducing (when correction is performed). In this case, the content of the re-correction is preferably set in accordance with the mechanical conditions. For example, in re-correction, image processing capable of obtaining the effect near to the effect by the mechanical conditions is carried out. In this case, the image quality of the final correction image is closer to an image quality in the case where the shooting condition of the shooting scene designated in reproducing is used in actual shooting.

The inverse conversion correction and the re-correction corresponding to the mechanical condition may include image recognition. In this case, a specific object (main object such as person) and background are separated, and thereafter, different image quality adjustment is performed with respect to them.

As described above, inverse conversion correction and re-correction are collectively are made unlike this embodiment, and the foregoing mechanical condition is included in the shooting condition (image quality correction condition). In this case, when inverse conversion correction and re-correction are collectively are made, processing corresponding to the mechanical condition is carried out. By doing so, the shooting condition of the shooting scene designated in reproducing is close to the image quality used in actual shooting.

Of course, the correction content is different in accordance with the combination of the shooting condition in shooting and the shooting condition (image quality correction condition) in reproducing (re-correcting). For this reason, the difference conditions of a plurality of types are previously stored in the image memory 17 in accordance with the shooting condition between shooting and reproducing. In correction, the difference condition is properly read in accordance with the shooting condition between shooting and reproducing, and then, correction is performed according to the difference condition.

Hereinafter, the shooting condition including the mechanical condition, the shooting processing corresponding to the shooting condition, and correction (image quality adjustment) with respect to the corresponding recorded image will be described. FIG. 7 is another shooting condition table Tn including each shooting condition corresponding to shooting scenes selectable by the best shot function and the foregoing mechanical conditions. FIG. 7 is a table corresponding to FIG. 3. Shooting parameters of the shooting condition table Tn include control items such as "focus," "aperture," "shutter speed," "EV shift," "white balance," "flash emission" and "saturation." The shooting parameters (control items) include "night view," "night person," "person and night view," "flower" and backlight person."

The "white balance" of the foregoing shooting parameters is a shooting condition realized via predetermining processing like this embodiment. For example, the gain control amplifier (AGC) of the analog processor 11 differs from this embodiment. Namely, imaging signal gain is adjustable every color such as R, G and B. The gain balance of the gain control amplifier is adjusted; therefore, the "white balance" is given as the shooting condition (mechanical condition) realized by the control of the imaging circuit system.

Hereinafter, a shooting processing in shooting corresponding to each shooting condition and correction (image quality adjustment) with respect to the recorded image will be described.

According to the shooting condition of the shooting condition name "night view," night shooting is carried out using scene (distance view) as a main in a state of keeping a night atmosphere. In shooting based on the shooting condition, "focus" is set to a spot AF mode in which a measuring range of an AF evaluation value is narrow. Moreover, a quantity of light is small due to night, and thus, flash illumination does not reach the distance view. For this reason, in order to secure a standard state brightness regardless of the distance to the object, "aperture" and "shutter speed" are set to auto (preset value corresponding to AE control). Simultaneously, in order to keep a night atmosphere, an EV value is limited to +2 EV, and shift (correction) is performed to carry out shooting.

Therefore, correction with respect to a recording image when "night view" is selected as a shooting scene is performed. For example, an average brightness of the whole image is determined, and then, the brightness of the whole image is corrected so that the average brightness becomes a predetermined value. By doing so, it is possible to obtain an image having the same atmosphere as the case where the foregoing shooting scene is selected in shooting.

According to the shooting condition of the shooting condition name "night person," night shooting is carried out using a person (short-range view) as main object. In shooting based on the shooting condition, "focus" is set to a spot AF mode, and there is no need of make bright the view (distance view). Therefore, "flash emission" is forcedly emitted, and "aperture" and "shutter speed" are set to auto so that the person (short-range view) only is brightly shot. Simultaneously, in order to keep the night atmosphere, the EV value is increased up to 1 EV as the limit (correction is performed), and further, "saturation" is increased up to one stage, and thereafter, shooting is carried out.

According to correction with respect to the recording image when "night person" is selected as a shooting scene, luminance correction is performed with respect to the whole of the image. Therefore, correction is performed with respect to the background where flash illumination does not reach. For this reason, in order to reproduce a shooting state having the same atmosphere as shooting, the profile of the person is detected via image processing, and luminance correction is selectively made with respect to the person. By doing so, it is possible to an image having the same atmosphere as the case where the foregoing shooting scene is selected.

According to the shooting condition of the shooting condition name "person and night view," night shooting is carried out using both person (short-range view) and view (distance view) as a main object. In shooting based on the shooting condition, "focus" is set to a spot AF mode, and "flash emission" is forcedly emitted, and thereby, the brightness of person (short-range view) is secured. Simultaneously, the brightness of the view (distance view) is secured by setting the "shutter speed" to auto because the "aperture" is set to auto, and thereby, the brightness is corrected double with respect to the person (short-range view).

According to correction with respect to the recording image when "person and night view" is selected as a shooting scene, image data conversion is performed to widen a value between the minimum luminance and the maximum luminance in luminance histogram distribution of the whole of the image. Contrast is kept, and thereby, it is possible to an image having the same atmosphere as the case where the foregoing shooting scene is selected.

According to the shooting condition of the shooting condition name "flower," shooting is carried out using a flower as a main object. In shooting based on the shooting condition, the flower is focused, and the background is unsharpened. The "focus" is set to a macro mode setting a focusing range within several centimeters, and the "aperture" is set to F3 or less so that the depth of field becomes small. Further, the "saturation" is increased up to one stage.

According to correction with respect to the recording image when "flower" is selected as a shooting scene, the profile of the flower is detected via image processing, and the background other than the flower is unsharpened. Via image processing, saturation is improved, and thereby, it is possible to an image having the same atmosphere as the case where the foregoing shooting scene is selected.

According to the shooting condition of the shooting condition name "backlight person," shooting is carried out using a person as an object in a backlight state. In shooting based on the shooting condition, "focus" is set to a multi-area mode having a wide measuring range of an AF evaluation value, and "flash emission" is forcedly emitted. Further, EV shift is set to +3 EV and "saturation" is increased up to one stage, and thereafter, shooting is carried out.

According to correction with respect to the recording image when "backlight person" is selected as a shooting scene, the profile of the person is detected via image processing, and luminance correction is selectively made with respect to the person, and thereby, it is possible to an image having the same atmosphere as the case where the foregoing shooting scene is selected.

In this embodiment, user selects a desired correction mode from some correction modes corresponding to the type of object by selecting the shooting scene (sample image) in correction with respect to the recording image. The method of selecting the desired correction mode by user is optional. In the case of the digital camera having the best shot function like this embodiment, user selects the shooting scene (sample image), and thereby, the correction mode is selected by user. By doing so, the following advantage is obtained. Namely, a correction work is done at the same feeling as the case where shooting is carried out using the best shot function.

According to this embodiment, the scene select screen 202 is displayed in accordance with user's key operation while a recorded image is displayed in the reproducing mode. Correction according the present embodiment is performed using the recorded image as a target. The following operation may be made.

For example, the scene select screen 202 is displayed in accordance with user's key operation in an optional mode, and then, user selects a desired shooting scene (correction mode). Thereafter, user selects one or several recorded images given as a correction target based on the shooting condition corresponding to the selected shooting scene via an optional method such as file name selection. Thereafter, the foregoing correction may be made with respect to the selected one or some recorded images.

In this case, corrections based on the same shooting condition are collectively made with respect to several recorded images. For example, framing is changed to shoot the same object several times. By doing so, correction is easy to give the same effect (atmosphere) to some recording images.

In this embodiment, the shot image given as a correction target is a recorded image shot using the best shot shooting function. The shooting condition corresponding to the type of the specific object in shooting is applied to the recorded image given as a correction target. For example, the recorded image is shot using a digital camera directly selecting a shooting mode in accordance with the type of the object. In other words, the shooting condition may be applied in accordance with the type of a specific object in shooting. The recorded image given as a correction target may be shot using devices other than the digital camera, for example, digital video camera, mobile phone including shooting function and PDA.

According to a digital camera of the embodiment, the scene select screen 202 comprising a plurality of sample images is displayed like the case where a shooting mode is selected in shooting in a reproducing state of displaying a recorded image (shot image) 211 (FIG. 5A). User selects a correction mode by an operation of selecting a desired shooting scene. An image quality of the recorded image 211 is corrected into an original image quality equivalent to the case where shooting is carried out without applying a shooting condition corresponding to a specific shooting mode. Further, the image quality is adjusted according to a shooting condition corresponding to a correction mode to display it as a corrected image 212. When a shutter key is pressed, the corrected image 212 is recorded (FIG. 5B). It is possible to give the same atmosphere in the case where shooting is carried out in a shooting mode different from shooting to the recorded image 211.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein. For example, the present invention can be practiced as a computer readable recording medium in which a program for allowing the computer to function as predetermined means, allowing the computer to realize a predetermined function, or allowing the computer to conduct predetermined means. The present invention is applicable to other devices including personal computer except the digital camera regardless of the shooting function. Moreover, according to the present invention, a moving image to which the shooting condition corresponding to the type of a specific object in shooting is applied is given as a correction target, and the image quality is adjusted.

What is claimed is:

1. A digital camera comprising:
    a data memory configured to store correction condition data for each of a plurality of shooting scenes included in a set of predetermined shooting scenes;
    a selector configured to select one of a set of shooting scenes included in the set of predetermined shooting scenes stored in the data memory;
    an image acquiring unit configured to set, when the selector selects one of a first set of shooting scenes while the digital camera is in a recording mode, acquiring correction condition data corresponding to said one of the first set of shooting scenes selected by the selector in the recording mode, to acquire image data in accordance with the set acquiring correction condition data, and to store the acquired image data in an image memory; and
    a reproducing unit configured to set, when the selector selects one of a second set of shooting scenes while the digital camera is in a reproducing mode, reproducing correction condition data corresponding to said one of the second set of shooting scenes selected by the selector in the reproducing mode, to correct the acquired image data, which is read out from the image memory, by using the reproducing correction condition data, and to display the corrected image data;
    wherein the first set of shooting scenes selectable by the selector in the recording mode and the second set of shooting scenes selectable by the selector in the reproducing mode are the same.

2. The digital camera according to claim 1, further comprising:
    an inverse correction unit configured to identify the acquiring correction condition data used to acquire the acquired image data, and to correct the image data read out from the image memory by an inverse of the identified correction condition data, thereby generating original acquired image data with an original image quality and no correction;

wherein the reproducing unit is configured to correct, when reproducing correction condition data corresponding to a selected shooting scene of the second set of shooting scenes is set for the image data which is acquired by the image acquiring unit with correction condition data corresponding to a selected shooting scene of the first set of shooting scenes and which is stored in the data memory, the stored image data by the inverse correction unit to convert the stored image data to the original acquired image data, and to correct the converted original acquired image data by using the reproducing correction condition data corresponding to the selected shooting scene of the second set.

3. The digital camera according to claim 2, wherein the shooting scenes correspond to types of objects; and wherein the original image quality is an image quality of an image acquired with a predetermined shooting condition which is determined based on a condition of an object irrespective of a type of the object.

4. The digital camera according to claim 1, wherein the data memory is configured to store a set of predetermined sample images corresponding respectively to each of the shooting scenes;

wherein the selector is configured to display a second set of sample images included in the set of sample images stored in the data memory, one of the shooting scenes being selected in accordance with a selection of a corresponding one of the sample images by a user; and wherein a set of sample images to be displayed by the selector in the recording mode and a set of sample images to be displayed by the selector in the reproducing mode are the same.

5. The digital camera according to claim 1, wherein the image acquiring unit is configured to set acquiring correction condition data including first shooting conditions of a shooting optical system and second shooting conditions of an imaging circuit, the first shooting conditions including aperture speed and shutter speed as the acquiring correction condition data corresponding to a shooting scene to be selected while the digital camera is in a recording mode; and wherein the reproducing unit is configured to set reproducing correction condition data irrespective of the first shooting conditions and the second shooting conditions, the reproducing correction condition data corresponding to a shooting scene to be selected while the digital camera is in a reproducing mode.

6. The digital camera according to claim 2, wherein the reproducing unit is configured to change acquiring correction condition data including first shooting conditions of a shooting optical system and second shooting conditions of an imaging circuit, the first shooting conditions including aperture speed and shutter speed, to reproducing correction condition data irrespective of the first shooting conditions and the second shooting conditions.

7. The digital camera according to claim 1, wherein the image acquiring unit is configured to store the acquired image data in the image memory with the acquiring correction condition data.

8. A control method for a digital camera which comprises a data memory configured to store correction condition data for each of a plurality of shooting scenes included in a set of predetermined shooting scenes, the method comprising:

selecting one of a set of shooting scenes included in the set of predetermined shooting scenes stored in the data memory;

when one of a first set of shooting scenes is selected while the digital camera is in a recording mode, setting acquiring correction condition data corresponding to said one of the first set of shooting scenes selected in the recording mode, acquiring image data in accordance with the set acquiring correction condition data, and storing the acquired image data in an image memory; and when one of a second set of shooting scenes is selected while the digital camera is in a reproducing mode, setting reproducing correction condition data corresponding to said one of the second set of shooting scenes selected in the reproducing mode, correcting the acquired image data, which is read out from the image memory, by using the reproducing correction condition data, and displaying the corrected image data;

wherein the first set of shooting scenes selectable in the recording mode and the second set of shooting scenes selectable in the reproducing mode are the same.

* * * * *